Figure 1:
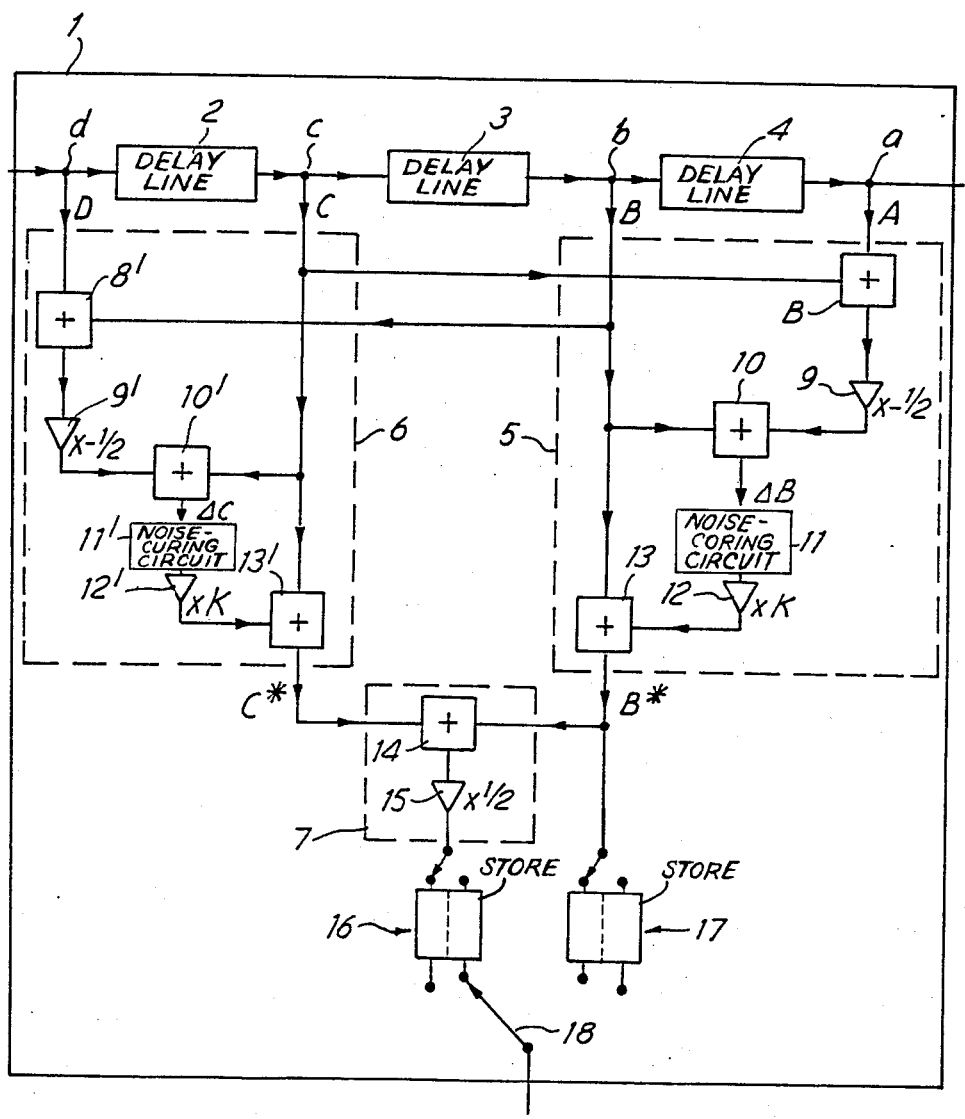

United States Patent [19]

Johnson

[11] Patent Number: 4,698,673
[45] Date of Patent: Oct. 6, 1987

[54] VIDEO SIGNAL PROCESSING

[75] Inventor: Nigel Johnson, Bagshott, England

[73] Assignee: EMI Limited, Hayes, England

[21] Appl. No.: 787,052

[22] Filed: Oct. 15, 1985

[30] Foreign Application Priority Data

Oct. 23, 1984 [GB] United Kingdom ............... 8426723

[51] Int. Cl.$^4$ ............................................. H04N 7/01
[52] U.S. Cl. ...................................... 358/140; 358/11;
  358/37; 358/166
[58] Field of Search ................. 358/11, 12, 37, 140,
  358/166

[56] References Cited

U.S. PATENT DOCUMENTS

| 4,426,661 | 1/1984 | Okada et al. | 358/140 |
| 4,558,347 | 12/1985 | Pritchard et al. | 358/11 |
| 4,577,225 | 3/1986 | Pritchard | 358/140 |

FOREIGN PATENT DOCUMENTS 1197097 7/1970 United Kingdom .
2003698 1/1982 United Kingdom .

*Primary Examiner*—James J. Groody
*Assistant Examiner*—Michael D. Parker
*Attorney, Agent, or Firm*—Fleit, Jacobson, Cohn & Price

[57] ABSTRACT

High-definition video signal are produced using processing equipment incorporating a unit with two vertical-aperture circuits and and an interpolator, the former taking the signals A and C, passing them through a summation amplifier and a divide-by-two invertor. After combining this signal with B at the summation amplifier, the output signal ΔB (which represents the vertical detail signal of B as compared to the signals A and C) is passed through a noise-coring circuit and any resulting output output added to B at the summation amplifier to produce a signal B* with enhanced vertical detail. Then signals B* and C* are averaged and alternately connected to the output of the unit, thereby to produce a high-definition video signal.

8 Claims, 2 Drawing Figures

VIDEO SIGNAL PROCESSING

The present invention relates to equipment for, and a method of, processing video signals to provide a high quality picture display.

A well-known technique for enhancing the sharpness of vertical transition of a television picture consists of providing an aperture correction circuit, as shown for example in British Patent Specification No. 1197097. In such an aperture correction circuit, a scanning line is processed in order to produce a vertical detail line in relation to its immediately-adjacent lines; after any appropriate boosting, the detail signal is added to the scanning line in order to provide a display signal with enhanced vertical definition. For plain picture areas, the detail signal should be zero, but in fact it has a value dependent solely on random noise. In order to prevent this random noise from being enhanced, the detail signal is passed through a non-linear circuit known as a noise-corer circuit which prevents transmission when the magnitude of a signal is below a predetermined threshold.

Another technique is disclosed in British Patent Specification No. GB 2003698B in which a television camera operates at twice the normal line rate to produce 625 lines per field, non-interlaced. Each line is applied to a vertical aperture connector following which the corrected lines are arranged in parts by adding delayed and undelayed corrected lines. Then the odd-numbered lines in each odd field are expanded to normal line duration and the even-numbered lines discarded. Similarly the even-numbered lines in each even field are expanded while the odd-numbered lines are discarded.

An object of the present invention is to provide processing of video signals with improved enhancement of vertical detail as compared to existing techniques. Another object is to provide such improved enhancement by utilizing a simple technique, capable of implementation with low-cost components, as compared with other methods of increased enhancement.

The present invention provides processing equipment for video signals, the equipment comprising means to enhance the vertical detail of each of two scanning lines of video information, means to interpolate the enhanced scanning lines, and means to switch between the interpolation means and the enhancing means, thereby to produce at the output of the switching means a signal of an increased number of lines per field.

The processing equipment may include means to interleave the output signal from the interpolating means with the output from the enhancement means corresponding to at least one of the scanning lines, and means to display the output signal from the interleaving means. Advantageously, there is also provided means to reduce the output signal of the interleaving means to half the normal scanning line time interval.

The processing equipment may include means to effect a delay on video signals, the delay means having a capacity of at least three lines of video information, and the delay means having means to provide outputs representing the values of the separate scanning lines at corresponding positions within the lines. Thus, preferably the delay means comprises three delay devices arranged in series, each delay device having a capacity of one scanning line and providing in use a delay period corresponding to a scanning line period.

In any form of the processing equipment, there may be provided means to effect control on the amount of enhancement on at least one of the scanning lines produced by the enhancement means.

Preferably the enhancement means includes two vertical aperture correction means arranged such that, in use, one such correction means operates on each of the two scanning lines.

Another aspect of the present invention provides a method of processing video signals, the method comprising enhancing the vertical detail of each of two scanning lines of video information interpolating the two enhanced scanning lines, and then switching between the interpolated signals and the enhanced signals, thereby to produce a signal of an increased number of lines per field.

The processing method may incorporate interleaving of the interpolated signal with at least one of the enhanced scanning lines and displaying the resultant interleaved signal.

Preferably, the method comprises reducing the output signal of the interleaving means to half the normal scanning line time interval.

The method may also include effecting a delay on video signals of at least three lines of video information thereby to provide outputs representing the values of the separate scanning lines at corresponding positions within the lines.

Moreover, the method may comprise effecting control on the amount of enhancement on at least one of the scanning lines produced by the enhancement means.

Preferably, the enhancing operation comprises applying vertical aperture correction to the scanning lines.

Processing of the video signals according to the present invention may be done within a television receiver or within a unit remote from the television receiver or monitor on which the picture is to be displayed.

Figure 2:
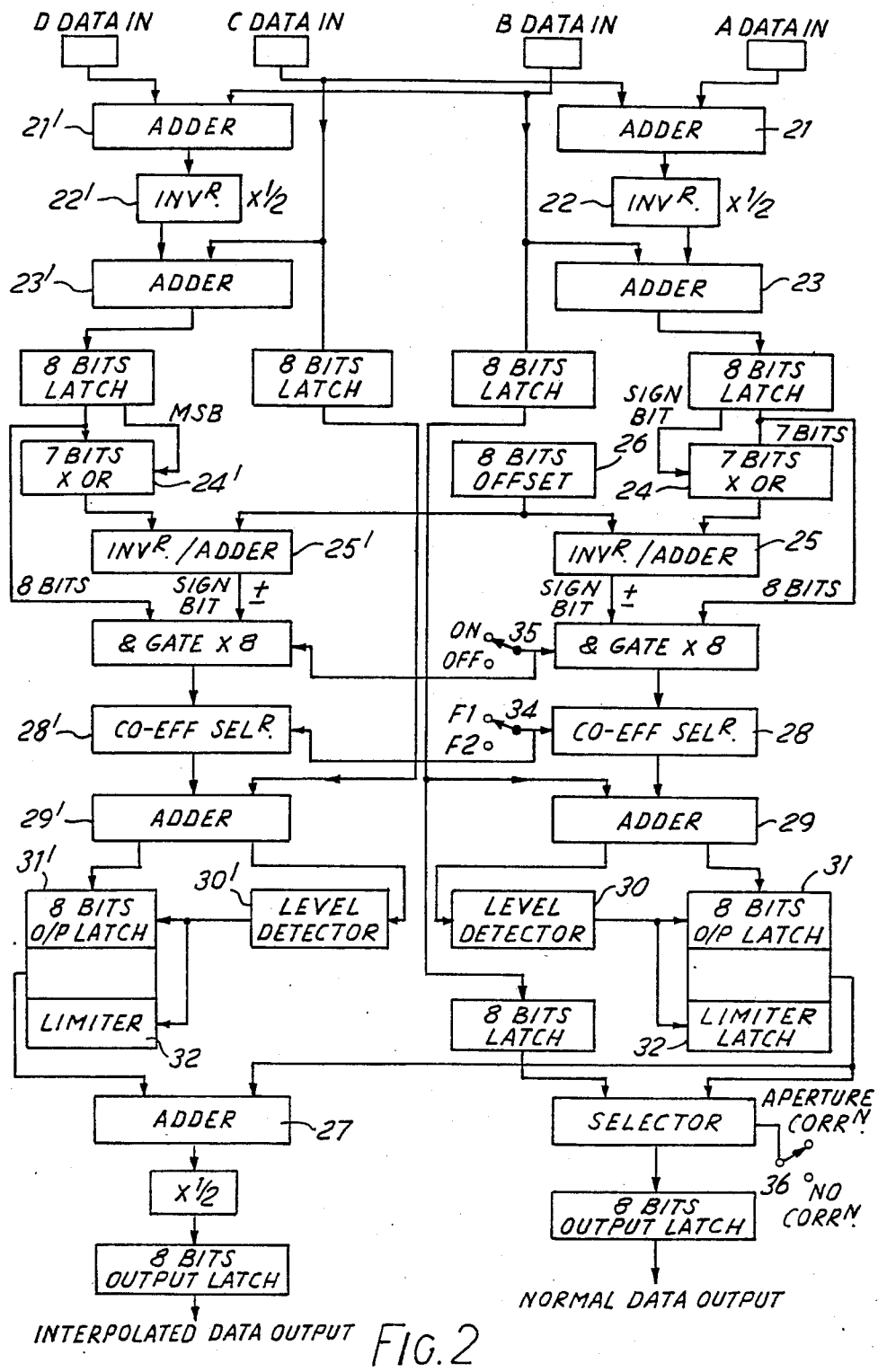

In order that the invention may more readily be understood, a description is now given, by way of example only, reference being made to the accompanying drawings, in which:

FIG. 1 is a block diagram of a signal-processing unit embodying the present invention; and FIG. 2 is a block diagram of another unit embodying the present invention.

FIG. 1 shows schematically signal-processing unit 1 which has three delay lines 2, 3 and 4, each of a duration corresponding to one scanning line period, thereby providing simultaneous access to equivalent positions in four consecutive scanning lines of video information at circuit locations a, b, c, d.

For the purpose of simplicity and clarity of explanation, the ensuing description of this embodiment of the invention relates to the unit 1 being in a situation whereby it is processing four consecutive scanning lines whose instantaneous values at the circuit locations a, b, c, d are A, B, C, D respectively. Clearly, the appropriate pixels in the four lines would be vertically adjacent one another.

The unit 1 consists of two vertical-aperture circuits 5 and 6 and an interpolator 7. Vertical-aperture circuit 5 takes the signals A and C, passes them through a summation amplifier 8 and a divide-by-two invertor 9, so that the resultant signal represents the inverse of the average value of A and C. After combining this signal with B at summation amplifier 10, the output signal ΔB (which represents the vertical detail signal of B as compared to the signals A and C) is passed through a noise-coring circuit 11 and any resulting output (i.e. other than one composed merely of noise) continues to an amplifier 12 in order to boost it by a factor K. It is then added to B at summation amplifier 13 to produce a signal B* with enhanced vertical detail.

Vertical-aperture circuit 6 is formed of components equivalent to those in circuit 5 but arranged so as to use signals A and D in order to enhance C and form an appropriate signal C*.

The two signals B* and C* are then passed to interpolator circuit 7 in which they are combined, with equal weighting, at summation amplifier 14 whose output is then passed to a divide-by-two device 15.

In order to provide a 625/50 sequential signal suitable for display on a television receiver, the output of device 15 needs to be taken alternatively, line by line, with the signal B* with a reduction of each line duration to one half of the normal interval (i.e. to $32\mu$ seconds). In order to achieve this, the output of device 15 is passed to one of the two separate compartments of a store 16 with an output rate twice that of the input rate, while the signal B* is passed to a similar two-compartment store 17. Hence, by suitable operation of a switch 18 which instructs a compartment of stores 16 and 17 to output when connection is made, an appropriate display signal is produced.

The amount of vertical-aperture correction applied to the lines is determined by the value of K; accordingly, the unit 1 may have controls to enable an operator to adjust manually the value of K and thereby select the degree of enhancement.

The unit 1 can incorporate a horizontal aperture corrector.

FIG. 2 shows in block diagram form, the processing operations within another form of unit embodying the present invention and suited to digital signal processing. The signals A and C, both positive values, are averaged and converted to complementary form by adder 21 and inverter 22, this complementary signal then being combined with the "actual" data of B in adder 23; in this way, the average signal of A and C is effectively subtracted from the B data. This resultant bipolar difference signal is then rectified using the sign bit output and the EXCLUSIVE-OR gate 24 and passed to the inverter/adder 25 (thereby effecting a subtraction operation), to compare the amplitude with the present "noise" held in unit 26. In the event of the magnitude of the difference signal being less than the threshold level, i.e. the inverter/adder 25 output being negative in value, the difference signal (from adder 23) is set to zero, with all bits cleared; thus in this situation no vertical enhancement takes place on the B data signal. The threshold value is adjusted on signal taking into account the signal-to-noise characteristics of the signal source. Thus on large plain areas where the difference signal will consist entirely of noise, the difference signal is set to zero, and the B data is used unmodified for display as "actual" lines in the sequential display; at the same time in plain picture areas this B data is averaged with the similarly processed and hence unmodified version of the C data line of information in adder 27 to create the necessary infill line, thus yielding a maximum signal/noise data output for plain areas in the picture source.

For areas of significant vertical detail where the difference signal exceeds the preset noise threshold, a weighted version of the difference signal, determined by the co-efficient selector 28, is added to the B data in adder 29 to provide an enhanced version of the latter. In turn this enhanced B data is examined for over-ranging or under-ranging in level detector 30, in which event it is clipped at peak white (i.e. all bits set high) or set to black level (i.e. all bits set low) in the latches 31, 32. A similar processing on the C data input takes place in parallel, and the two sets of outputs are averaged as before, this time yielding an enhanced version of the interpolated data output at output 33.

The enhancing process is provided with two sets of co-efficients F1, F2, preselected by switch 34, which controls the selector 28. In addition switch 35 enables the enhancing to be switched out by setting the difference signal at the output of subtractor 25 to zero on both the interpolated and actual data paths.

The switch 36 is provided to switch out the enhancement in the normal data path only.

A processing unit embodying the present invention can be used in any interlaced television standard.

I claim:

1. Processing equipment for video signals, the equipment comprising input means to receive video signals, at a line rate, for passage to means to enhance the vertical detail of each of two adjacent scanning lines of video information, means to interpolate the two enhanced scanning lines, and means to combine the video information derived from the said scanning lines, the combiner means including means to switch between an output of the interpolation means and an output of the enhancing means, thereby to produce an increased line rate at the output of the switching means as compared to that at the input means.

2. Equipment according to claim 1, comprising means to interleave output signals from the interpolating means and the enhancement means, and means to display output signals from the interleaving means.

3. Equipment according to claim 1 comprising means to reduce the line duration of an output signal of the interleaving means to half that of the video signals input.

4. Equipment according to claim 1, incorporating means to effect a delay on said video signals, the delay means having a capacity of at least three lines of video information, and the delay means having means to provide outputs representing values of separate scanning lines at corresponding positions within the lines.

5. Equipment according to claim 1 comprising means to effect control on the amount of enhancement on at least one of the enhanced scanning lines provided by the enhancement means.

6. A method of processing video signals, the method comprising receiving video signals at a line rate, enhancing the vertical detail of each of two adjacent scanning lines of video information in said video signals, interpolating the two enhanced scanning lines, and then combining the video information derived from said scanning lines, the combining stage including switching between the interpolated signals and the enhanced signals, thereby to produce an increased line rate after the combination stage as compared to that at the reception stage.

7. A method according to claim 6 comprising interleaving interpolated signals with enhanced scanning lines and displaying the resultant interleaved signal.

8. A method according to claim 6, comprising effecting control on the amount of enhancement on at least one of the scanning lines.

* * * * *